United States Patent Office 2,769,810
Patented Nov. 6, 1956

2,769,810

PROCESS FOR PREPARING HYDROXY-N-METHYLMORPHINAN

Eiji Ochiai, Bunkyo-ku, Tokyo, and Morio Ikehara, Nakano-ku, Tokyo, Japan, assignors to Shionogi & Co., Ltd., Higashi-ku, Osaka, Japan No Drawing. Application July 13, 1955,
Serial No. 521,892

Claims priority, application Japan August 15, 1955

4 Claims. (Cl. 260—285)

This invention relates to a new process for preparing hydroxy-N-methylmorphinan useful as an analgesic from coal tar isoquinoline.

Prior to this invention, we have found a method of preparing 5,6,7,8-tetrahydroisoquinoline, which comprises reducing catalytically 4-aminoisoquinoline obtained from coal tar isoquinoline to 4-amino-5,6,7,8-tetrahydroisoquinoline and deaminating the latter by diazotiation to 5,6,7,8-tetrahydroisoquinoline (Pharm. Bull., 1954, vol. 2, p. 72).

Further, we have found that 5,6,7,8-tetrahydroisoquinoline is oxidized with hydrogen peroxide and acetic acid to the N-oxide, which is converted to 1-chloro-5,6,7,8-tetrahydroisoquinoline by treating with phosphor oxychloride (Pharm. Bull., 1954, vol. 2, p. 109).

In this invention, the starting material is 1-chloro-5,6,7,8-tetrahydroisoquinoline obtained by the above method. This compound may be, of course, prepared by means of the other method heretofore employed, but we prefer to employ the above from a commercial standpoint.

In carrying out this invention, we start with condensing 1-chloro-5,6,7,8-tetrahydroisoquinoline with alkoxybenzyl cyanide, which has no radical at least on one side of the ortho positions, by use of sodium amide. In this condensation, as the condensing agent may be used the other alkali metal amide or alkaline earth metal amide, too.

The resulting 1-(α-cyano)alkoxybenzyl-5,6,7,8-tetrahydroisoquinoline reacts very difficultly with methyl iodide, while its hydrolyzing produce, 1-(α-carbamoyl)-alkoxybenzyl-5,6,7,8-tetrahydroisoquinoline, reacts easily with the same to produce the methiodide, which is reduced by means of platinum catalyst in alkalinity to 1-(α-carbamoyl)alkoxybenzyl - N - methyl - 1,2,3,4,5,6,7,8-octahydroisoquinoline. By heating with a strong acidic condensing agent such as concentrated phosphoric acid, or concentrated hydrohalogenic acid, this base undergoes morphinan ring-closure accompanied with simultaneous elimination of its carbamoyl radical and hydrolysis of its alkoxy radical to produce hydroxy-N-methylmorphinan.

The reactions in accordance with this invention may be represented diagrammatically as follows:

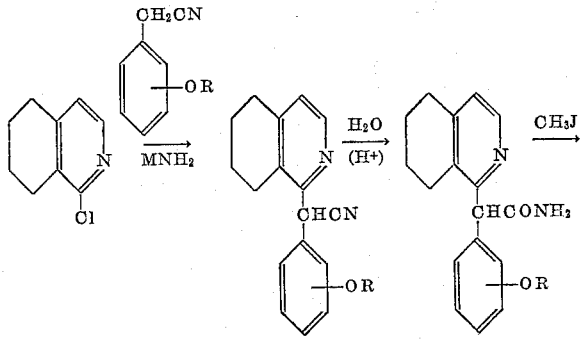

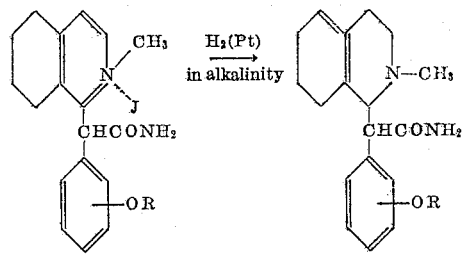

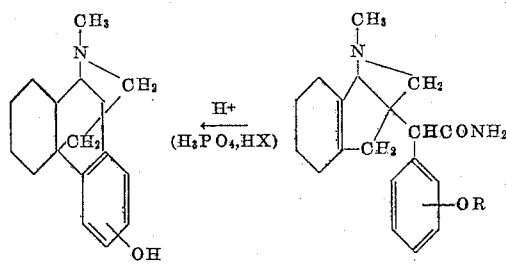

wherein R is a lower alkyl group, M is selected from the group consisting of alkali metal and alkaline earth metal, and X is a halogen atom.

The following example illustrates a method of carrying out the present invention, but it is to be understood that this example is given by way of illustration, and not of limitation.

Example

The preparation of 1 - [p - (α - cyano)methoxybenzyl]-5,6,7,8-tetrahydroisoquinoline.—To the solution of 1 g. of p-methoxybenzyl cyanide in 20 cc. of anhydrous toluene 0.4 g. of sodium amide is added. To the mixture the solution of 0.8 g. of 1-chloro-5,6,7,8-tetrahydroisoquinoline is added dropwise under cooling and stirring. After refluxing at 140 to 150° C. for five hours the reaction mixture is decomposed with a little water and then extracted with hydrochloric acid in the proportion of 30 parts of water to one part of hydrogen chloride. The hydrochloric acid layer is washed with ether, alkalized with sodium carbonate, and extracted with chloroform. The chloroform layer is dried over the sodium sulfate, the solvent distilled off, and 1.2 g. of the object is obtained, which is used without further purification. This compound gives a negative chloric test, and its picrate is needle crystal melting at 218° C. The analytical value of the picrate corresponds to that of 1-[p-(α-cyano)methoxybenzyl]-5,6,7,8-tetrahydroisoquinoline dipicrate.

Analysis.—Calcd. for $C_{18}H_{18}N_2O.(C_6H_3N_3O_7)_2$: C, 49.0; H, 3.3. Found: C, 49.54; H, 2.94.

The preparation of 1-[p-(α-carbamoyl)methoxybenzyl]-5,6,7,8-tetrahydroisoquinoline.—Into 10 cc. of concentrated hydrochloric acid 0.9 g. of 1-[p-(α-cyano)methoxybenzyl]-5,6,7,8-tetrahydroisoquinoline obtained above is dissolved, heated on a water-bath at 70° C. for one hour, and allowed to stand at room temperature for twenty-four hours. Then, the reaction mixture is diluted with water, alkalized with natron, and extracted with chloroform. After drying the chloroform layer on sodium sulfate, the solvent is distilled off to yield 0.8 g. of the object. This compound is crystallized out from benzene to give crystals melting at 136 to 137° C., of which the analytical value corresponds to that of 1-[p-(α-carbamoyl(methoxybenzyl]-5,6,7,8-tetrahydroisoquinoline.

Analysis.—Calcd. for $C_{18}H_{20}N_2O_2$: C, 73.0; H, 6.8; N, 9.5. Found: C, 73.26; H, 6.51; N, 9.56.

The preparation of 1-[p-(α-carbamoyl)methoxybenzyl]-N - methyl-1,2,3,4,5,6,7,8-octahydroisoquinoline.—Into 5 cc. of the solution of benzene and ethanol (1:2), 0.5 g. of 1-[p-(α-carbamoyl)methoxybenzyl]-5,6,7,8-tetrahydroisoquinoline is dissolved, and then 2 cc. of methyl iodide added. The mixture is heated in a sealed pipe at the temperature from 90 to 100° C. for three hours. After cooling the content of the pipe is vaporized off to yield 0.5 g. of the methiodide as amorphous. This methiodide is dissolved into 20 cc. of methanol and 10 cc. of 5% natron solution is added. This mixture solution is reduced contactically at room temperature in the presence of platinum catalyst prepared from 0.5 g. of platinum oxide. After five hours the reaction goes on very slow with absorbing about 50 cc. of hydrogen gas. The reaction is herewith stopped and the catalyst filtered off. The filtrate is saturated with carbon dioxide and then methanol distilled off under a reduced pressure. The residue is shaken with ether to extract the base. By distilling off the solvent 0.35 g. of liquid base is obtained. This base g ves yellow flat picrate melting at 126 to 128° C., of which the analytical value corresponds to that of 1 - [p - (α - carbamoyl)methoxybenzyl] - N - methyl-1,2,3,4,5,6,7,8-octahydroisoquinoline.

*Analysis.*—Calc. for $C_{19}H_{26}N_2O_2 \cdot C_6H_3N_3O_7$ (picrate): C, 55.3; H, 5.4; N, 12.9. Found: C, 55.60; H, 5.19; N, 12.61.

*The preparation of 3-hydroxy-N-methylmorphinan.*—Into 3 cc. of concentrated phosphoric acid (d=1.7), 0.3 g. of the base obtained above is dissolved, and heated at the temperature from 150 to 160° C. for forty hours. After cooling, the reaction mixture is diluted with water, alkalized with 10% natron solution and shaken with ether to remove dissolvable substance. After saturating the water layer with carbon dioxide, it is shaken with ether. The ether extract is dried over sodium sulfate and the solvent distilled off. The residue is crystallized out from ethanol to yield 0.1 g. of the crystal of 3-hydroxy-N-methyl-morphinan melting at 250° C.

*Analysis.*—Calcd. for $C_{17}H_{23}NO$: C, 79.3; H, 9.0; N, 5.5. Found: C, 79.83; H, 8.66; N, 57.0.

What we claim is:

1. A process for preparing hydroxy-N-methylmorphinan which comprises condensing 1-chloro-5,6,7,8-tetrahydroisoquinoline with lower alkoxybenzyl cyanide which has no alkoxy radical at least on one side of the ortho positions in the presence of a condensing agent selected from the group consisting of alkali metal amide and alkaline earth metal amide, reacting 1-(α-carbamoyl)alkoxybenzyl-5,6,7,8-tetrahydroisoquinoline obtained by the hydrolysis of the resulting 1-(α-cyano)alkoxybenzyl-5,6,7,8-tetrahydroisoquinoline with methyl iodide to methiodide thereof, reducing the methiodide by means of platinum catalyst to 1-(α-carbamoyl-alkoxybenzyl - N - methyl-1,2,3,4,5,6,7,8-octahydroisoquinoline, and then treating the latter with a strong acidic condensing agent selected from the group consisting of concentrated phosphoric acid and concentrated hydrohalogenic acid to produce the object.

2. A process for preparing 3-hydroxy-N-methylmorphinan which comprises condensing 1-chloro-5,6,7,8-tetrahydroisoquinoline with p-methoxybenzyl cyanide in the presence of a condensing agent selected from the group consisting of alkali metal amide and alkaline earth metal amide, reacting 1 - [p - (α-carbamoyl)methoxybenzyl]-5,6,7,8-tetrahydroisoquinoline obtained by the hydrolysis of the resulting 1-[p-(α-cyano)methoxybenzyl]-5,6,7,8-tetrahydroisoquinoline with methyl iodide to methiodide thereof, reducing the methiodide by means of platinum catalyst to 1-[p-(α-carbamoyl)methoxybenzyl]-N-methyl-1,2,3,4,5,6,7,8-octahydroisoquinoline, and then treating the latter with a strong acidic condensing agent selected from the group consisting of concentrated phosphoric acid and concentrated hydrohalogenic acid to produce the object.

3. A process for preparing hydroxy-N-methylmorphinan which comprises condensing 1-chloro-5,6,7,8-tetrahydroisoquinoline with lower alkoxybenzyl cyanide which has no alkoxy radical at least on one side of the ortho positions in the presence of sodium amide, reacting 1-(α-carbamoyl)alkoxybenzyl-5,6,7,8 - tetrahydroisoquinoline obtained by the hydrolysis of the resulting 1-(α-cyano)alkoxybenzyl-5,6,7,8-tetrahydroisoquinoline with methyl iodide to methiodide thereof, reducing the methiodide by means of platinum catalyst to 1-(α-carbamoyl)alkoxybenzyl - N - methyl-1,2,3,4,5,6,7,8-octahydroisoquinoline, and then treating the latter with concentrated phosphoric acid to produce the object.

4. A process for preparing 3-hydroxy-N-methylmorphinan which comprises condensing 1-chloro-5,6,7,8-tetrahydroisoquinoline with p-methoxybenzyl cyanide in the presence of sodium amide, reacting 1-[p-(α-carbamoyl)-methoxybenzyl]-5,6,7,8 - tetrahydroisoquinoline obtained by the hydrolysis of the resulting 1-[p-(α-cyano)methoxybenzyl]-5,6,7,8-tetrahydroisoquinoline with methyliodide to methiodide thereof, reducing the methiodide by means of platinum catalyst to 1-[p-(α-carbamoyl)methoxybenzyl]-N-methyl-1,2,3,4,5,6,7,8 - octahydroisoquinoline, and then treating the latter with concentrated phosphoric acid to produce the object.

No references cited.